L. R. DICE.
EXPOSURE METER.
APPLICATION FILED MAY 12, 1917.
1,259,373.
Patented Mar. 12, 1918.
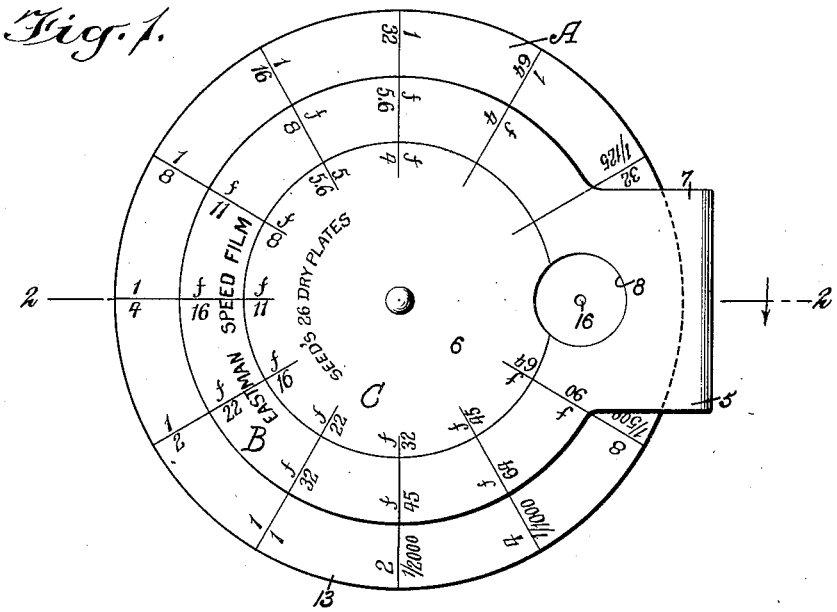
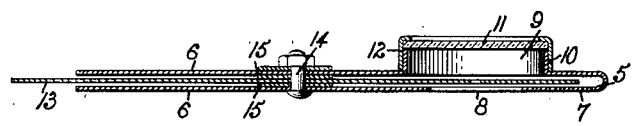
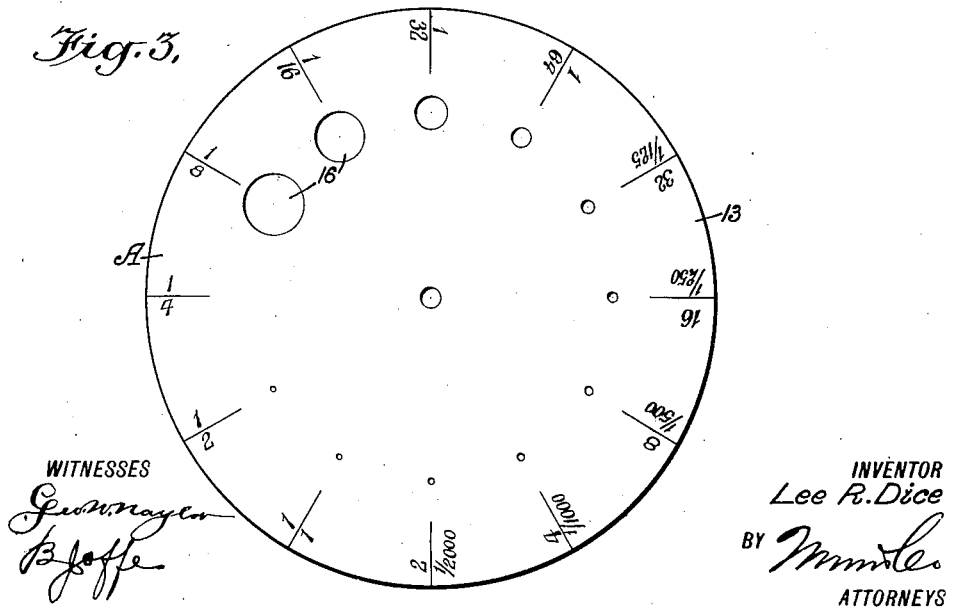
WITNESSES
INVENTOR
Lee R. Dice
BY
ATTORNEYS

UNITED STATES PATENT OFFICE.

LEE R. DICE, OF MANHATTAN, KANSAS.

EXPOSURE-METER.

1,259,373.　　　　　Specification of Letters Patent.　　Patented Mar. 12, 1918.

Application filed May 12, 1917.　Serial No. 168,120.

*To all whom it may concern:*

Be it known that I, LEE R. DICE, a citizen of the United States, and a resident of Manhattan, in the county of Riley and State of Kansas, have invented a new and Improved Exposure-Meter, of which the following is a full, clear, and exact description.

The invention relates to exposure meters used in connection with photography.

An object of the invention is to provide a simple, inexpensive and efficient meter.

Another object of the invention is to provide an exposure meter having a screen which will allow only those rays to pass through which are photographically effective.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of an exposure meter embodying my invention;

Fig. 2 is a cross section on line 2—2, Fig. 1; and

Fig. 3 is an elevation of the disk controlling the quantity of light coming to the eye when measuring.

Referring to the drawings, 5 is the carrier, which is preferably formed of a flat member having circular heads 6 united by a portion 7 which is folded in the middle to bring the heads 6 opposite each other. The carrier has a pair of coaxial apertures 8 and 9 each formed at the junction of the circular heads with the portion 7. The aperture 9 is preferably larger than the aperture 8 and is bordered by a flange or collar 10 rising from the outer face of the carrier. This collar forms a seat for a color screen 11 which is retained on the collar by an apertured cap 12 fitting snugly over the collar, the aperture of the cap exposing the screen 11 to the rays of light.

A disk 13 is mounted to revolve between the heads 6 of the carrier, the pivot or axis being formed by a bolt 14 which passes through the center of the heads 6 and which maintains the heads against the washers 15 interposed between the heads and the disk 13. The disk has a plurality of apertures 16 of different sizes or diameters disposed symmetrically on the circumference, the radius of which is preferably equal to the distance between the center of the head and the apertures 8 and 9. The disk is provided with a scale A, the angular distance between the divisions of which is equal to the angular distance between the adjacent apertures 16. Preferably the divisions are on the radial lines passing through the centers of the apertures. The carrier 5 has also a scale B at the margin of the head, the angular distances between the divisions of which scale are equal to the angular distances on the scale A. Preferably the divisions of the scale B indicate the diaphragm opening; while those of scale A indicate the time of exposure. The divisions of the two scales are adapted to register when any of the apertures 16 of the disk is coaxial with the apertures 8 and 9 of the carrier; and according to the size of the apertures 16 alining with the apertures 8 and 9, certain time exposures will aline with predetermined diaphragm openings, as, for example, the aperture 16 in alinement with apertures 8 and 9 in the carrier brings $\frac{1}{64}$ on the scale A in alinement with F. 4 on the scale B; $\frac{1}{32}$ with F. 5.6 . . . ; and 8 with F. 90.

The diaphragm openings of scale B are marked according to the character of the emulsion with which this scale is to be used. As shown in Fig. 1, it is designed for Eastman's speed films. Another scale C may be provided on the carrier concentric with the scale B on which the divisions also show diaphragm openings predetermined for a different character of emulsion; as shown in Fig. 1, it is specially adapted for Seed's dry plates. The color screen 11, to be accurate, must be suited to the emulsion with which it is to be used. This screen is removable, so that any other screen may be substituted, and by providing additional scales on the carriers the exposure meter can be used with a large variety of plates.

The use of the meter is as follows: The light coming from the object to be photographed is caused to pass through the color screen 11 before it passes through the apertures in the disk; the disk is turned to bring the smallest opening at which the object appears to the eye in the desired brilliancy; and then by selecting the desired diaphragm opening from the scale corresponding to the film or plate used, the desired time of exposure will be found in alinement with the division showing the desired diaphragm opening.

For general landscapes, the proper exposure will be indicated at the smaller openings where important parts of the scene are clearly in view and a small amount of details appear in the shadows. For portraits or views in which full detail is desired in shadows, a larger opening can be used, that is, the smallest opening at which the desired amount of details can be seen. Any suitable ratio may be selected between the sizes of the adjacent apertures 16, but preferably the area of each succeeding opening from the smaller to the larger increases twice. It will be noted from Fig. 3 that only eleven openings are shown, one place being left blank.

I claim:

1. An exposure meter comprising,—a carrier having coaxial apertures, a screen covering one of the apertures, a member having a plurality of apertures of varying diameters movable to present any of its apertures between the apertures of the carrier, and scales on said carrier and member adapted to register when any of the apertures of the member alines with the apertures of the carrier.

2. An exposure meter comprising,—a carrier having spaced coaxial apertures, a color screen covering one of the apertures, a member having a plurality of apertures of varying diameters movable to present any of its apertures between the screen and the other apertures in the carrier, and scales on said carrier and member adapted to register when any of the apertures of the member alines with those of the carrier.

3. An exposure meter comprising,—a carrier having spaced circular heads, a disk revoluble between said heads, said carrier having an aperture in each of the heads, said apertures being coaxial, a color screen covering one of the apertures, said disk having a plurality of apertures of different diameters adapted to register with the apertures in the heads, and scales on said disks and heads of the carrier adapted to register when any of the apertures of the disk register with the apertures in the heads of the carrier.

4. An exposure meter comprising,—a carrier having two circular heads united by a straight portion folded to bring said heads opposite one another, a disk revoluble between the heads of the carriers, said carrier having an aperture in each head at the junction of same with the straight portion, the apertures of the heads alining, an exterior collar about one of the openings, a color screen resting on the collar, an apertured cap retaining the screen on the collar, said disk having a plurality of apertures of different diameters each adapted to register with the apertures of the heads of the carrier, and scales on said carrier and disk adapted to register when any of the apertures on the disk registers with the apertures in the heads of the carrier.

5. An exposure meter comprising,—a carrier having coaxial apertures, a color screen, means for removably securing the color screen to one of said openings, a member having a plurality of apertures of varying diameters movable to present any of its apertures between and in register with the apertures in the carrier, and scales on said carrier and member adapted to register when any of the apertures of the member registers with those of the carrier.

LEE R. DICE.